(12) United States Patent
King et al.

(10) Patent No.: US 7,052,420 B2
(45) Date of Patent: May 30, 2006

(54) OVER-RUNNING CLUTCH PULLEY WITH COATING MATERIAL

(75) Inventors: Randall King, Kingwood, TX (US); Mary-Jo Liston, Whitmore Lake, MI (US)

(73) Assignee: NTN Corporation, (JP)

( * ) Notice: Subject to any disclaimer, the term of this patent is extended or adjusted under 35 U.S.C. 154(b) by 177 days.

(21) Appl. No.: 10/381,764

(22) PCT Filed: May 31, 2001

(86) PCT No.: PCT/US01/17520

§ 371 (c)(1),
(2), (4) Date: Dec. 18, 2003

(87) PCT Pub. No.: WO01/92760

PCT Pub. Date: Dec. 6, 2001

(65) Prior Publication Data

US 2004/0092346 A1 May 13, 2004

Related U.S. Application Data

(60) Provisional application No. 60/208,244, filed on May 31, 2000.

(51) Int. Cl.
*F16D 41/20* (2006.01)
(52) U.S. Cl. .................................................. 474/74
(58) Field of Classification Search ............ 474/69, 474/74; 192/415, 75, 76, 107 M, 107 T, 192/41 S
See application file for complete search history.

(56) References Cited

U.S. PATENT DOCUMENTS

| | | | | |
|---|---|---|---|---|
| 4,536,454 A * | 8/1985 | Haasl | .................. | 428/516 |
| 5,598,913 A * | 2/1997 | Monahan et al. | ......... | 192/41 S |
| 6,200,221 B1 * | 3/2001 | Maejima et al. | ............... | 464/45 |
| 6,394,248 B1 * | 5/2002 | Monahan et al. | ......... | 192/41 S |
| 6,637,570 B1 * | 10/2003 | Miller et al. | .............. | 192/41 S |
| 6,691,846 B1 * | 2/2004 | Titus et al. | .............. | 192/41 S |
| 6,761,656 B1 * | 7/2004 | King et al. | ................... | 474/74 |
| 6,923,303 B1 * | 8/2005 | Liston et al. | ............. | 192/41 S |
| 2003/0098007 A1 * | 5/2003 | Tabuchi et al. | ............. | 123/200 |

* cited by examiner

*Primary Examiner*—Vicky A. Johnson
(74) *Attorney, Agent, or Firm*—Brinks, Hofer, Gilson & Lione

(57) ABSTRACT

The over-running clutch pulley (10) includes a sheave member (20), a hub member (22) a clutch member (24), and a coating (26), which cooperate to rotationally engage an input device (12) and an output device (14). The sheave member (20) preferably includes a sheave input section (28) defining a sheave input surface (30) adapted to engage the input device (12), and a sheave clutch section (32) defining a sheave clutch surface (34). Similarly, the hub member (22) preferably includes a hub output section (36) defining a hub output surface (38) adapted to engage the output device (14), and a hub clutch section (40) defining a hub clutch surface (42). The coating (26) is disposed on the sheave input surface (30), the sheave clutch surface (34), the hub output surface (38), and the hub clutch surface (42), which protects against substantial corrosion and increases the wear resistance of these surfaces, while minimizing the cost of the over-running clutch pulley (10).

11 Claims, 1 Drawing Sheet

OVER-RUNNING CLUTCH PULLEY WITH COATING MATERIAL

This application claims the benefit of Provisional Application No. 60/208,244, filed May 31, 2000.

TECHNICAL FIELD

This invention relates generally to devices in the over-running clutch field, and more specifically to an improved over-running clutch pulley for use with an accessory device driven by an automotive engine with a belt drive.

BACKGROUND

During the operation of an automotive engine, a drive belt is typically used to power and operate various accessory devices. One of these accessory devices is typically an automotive alternator, which provides electrical power to the automobile. While several arrangements of drive belts are in use, the serpentine arrangement, which drives several accessory devices, is currently most favored. Serpentine arrangements typically include a drive pulley connected to the crankshaft of the engine (the "output device") and a drive belt trained about the drive pulley. The drive belt is also trained about one or more conventional driven pulleys, which are connected to the input shafts of various accessories devices (the "input device").

Most conventional driven pulleys are made from a one-piece design with no over-running capabilities. In other words, the conventional driven pulleys are rigidly mounted to the input shaft and are incapable of allowing relative rotational movement between any section of the driven pulley and the input shaft. As a result of the lack of any over-running capabilities and of the generation of significant inertia by the accessory, relative slippage between the drive belt and the driven pulley may occur if the drive belt suddenly decelerates relative to the input shaft. The relative slippage may cause an audible squeal, which is annoying from an auditory standpoint, and an undue wear on the drive belt, which is undesirable from a mechanical standpoint.

In a typical driving situation, the drive belt may experience many instances of sudden deceleration relative to the input shaft. This situation may occur, for example, during a typical shift from first gear to second gear under wide open throttle acceleration. This situation is worsened if the throttle is closed or "back off" immediately after the shift. In these situations, the drive belt decelerates very quickly while the driven pulley, with the high inertia from the accessory device, maintains a high rotational speed, despite the friction between the drive belt and the driven pulley.

In addition to the instances of sudden deceleration, the drive belt may experiences other situations that cause audible vibration and undue wear. As an example, a serpentine arrangement with conventional driven pulleys may be used with an automobile engine that has an extremely low idle engine speed (which may increase fuel economy). In these situations, the arrangement typically experiences "belt flap" of the drive belt as the periodic cylinder firing of the automotive engine causes the arrangement to resonate within a natural frequency and cause an audible vibration and an undue wear on the drive belt.

The disadvantage of the conventional driven pulleys, namely the audible squeal, the undue wear, and the vibration of the drive belt, may be avoided by the use of an over-running clutch pulley instead of the conventional driven pulley. An over-running clutch pulley allows the pulley to continue to rotate at the same rotational speed and in a same rotational direction after a sudden deceleration of the drive belt. In a way, the over-running clutch pulley functions like the rear hub of a typical bicycle; the rear hub and rear wheel of a conventional bicycle continue to rotate at the same rotational speed and in the same rotational direction even after a sudden deceleration of the pedals and crankshaft of the bicycle. An example of an over-running clutch pulley is described in U.S. Pat. No. 5,598,913 issued to the same assignee of this invention and hereby incorporated in its entirety by this reference.

Since many customers of new automobiles are demanding longer lives, with relatively fewer repairs, for their new automobiles, there is a need in the automotive field, if not in other fields, to create an over-running clutch pulley with increased wear resistance. This invention provides an over-running clutch pulley with features intended to increase wear resistance, while minimizing the costs of the over-running clutch pulley.

DETAILED DESCRIPTION OF THE PREFERRED EMBODIMENT

The following description of the preferred embodiment of the invention is not intended to limit the scope of this invention to this preferred embodiment, but rather to enable any person skilled in the art of over-running clutches to make and use this invention.

Figure 1:
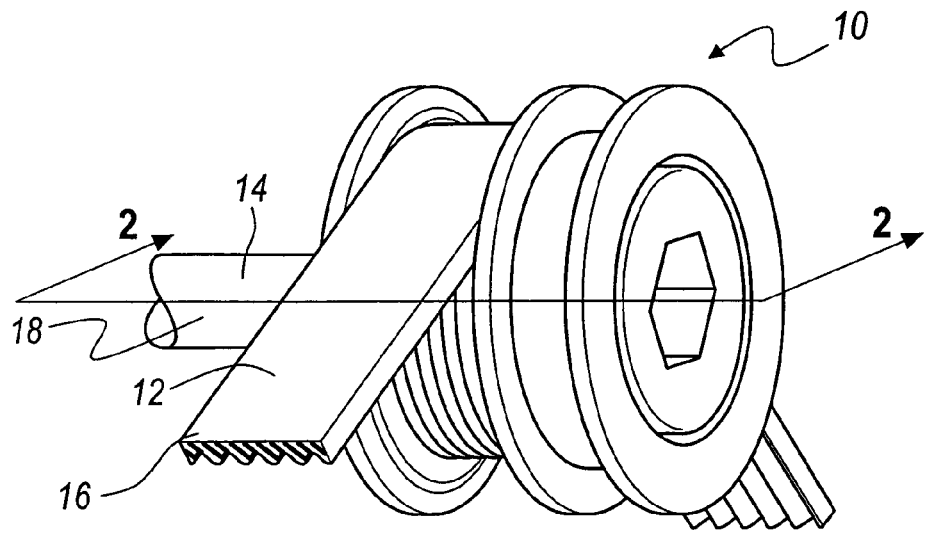
FIG. 1 is a perspective view of an over-running clutch pulley of the invention, shown with a drive belt as the input device and a cylindrical shaft as the output device.

As shown in FIG. 1, the invention includes an over-running clutch pulley 10 for rotationally engaging an input device 12 and an output device 14. The over-running clutch pulley 10 has been designed for use with a drive belt 16 as the input device 12, and with a cylindrical shaft 18 as the output device 14. More specifically, the over-running clutch pulley 10 has been particularly designed for use with a drive belt 16 with a grooved surface and a cylindrical shaft 18 of an automotive alternator. The over-running clutch pulley 10 may be used, however, in other environments, with other suitable input devices, such as smooth belt, a toothed belt, a V-shaped belt, or even a toothed gear, and with other suitable output devices, such as a polygonal shaft. Furthermore, the over-running clutch pulley 10 may be used in an environment with two devices that alternate their rotational input responsibilities, and in an environment with an "output device" that actually provides rotational input and with an "input device" that actually receives rotational input. In these alternative embodiments, the terms "input device" and "output device" are interchangeable.

Figure 2:
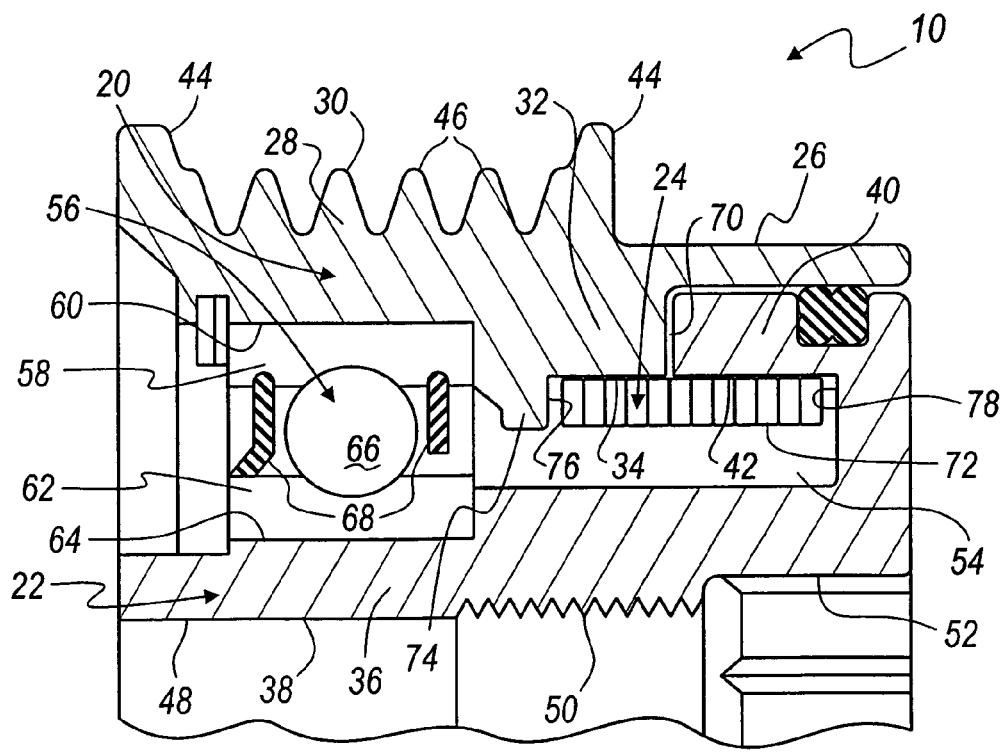
FIG. 2 is a partial cross-section view, taken along the line 2—2 of FIG. 1, of the over-running clutch pulley of the preferred embodiment.

As shown in FIG. 2, the over-running clutch pulley 10 of the preferred embodiment includes a sheave member 20, a hub member 22 located substantially concentrically within the sheave member 20, a clutch member 24, and a coating 26, which cooperate to rotationally engage the drive belt and the cylindrical shaft. The sheave member 20 preferably includes a sheave input section 28 defining a sheave input surface 30 adapted to the engage the input device, and a sheave clutch section 32 defining a sheave clutch surface 34. Similarly, the hub member 22 preferably includes a hub output section 36 defining a hub output surface 38 adapted to engage the output device, and a hub clutch section 40 defining a hub clutch surface 42. In the preferred embodiment, the coating 26 is disposed on the sheave input surface 30, the sheave clutch surface 34, the hub output surface 38, and the hub clutch surface 42. The coating 26, which is disposed on these surfaces instead of selectively avoiding one or more of these surfaces, protects against substantial corrosion and increases the wear resistance, while minimizing the cost of the over-running clutch pulley.

The sheave input section 28 of the sheave member 20 of the preferred embodiment functions to engage the drive belt. To substantially prevent rotational and axial slippage of the sheave member 20 and the drive belt, the sheave input section 28 preferably defines the sheave input surface 30 with two sheave input shoulders 44 and at least one sheave input groove 46. The sheave input section 28 may alternatively define other suitable surfaces, such as toothed surfaces or ribbed surfaces, to engage the input device. The sheave input surface 30 is preferably outwardly directed (away from the rotational axis of the over-running clutch pulley 10) and is preferably substantially cylindrically shaped. The sheave input section 28 is preferably made from conventional structural materials, such as steel, and with conventional methods, but may alternatively be made from other suitable materials and from other suitable methods.

The hub output section 36 of the hub member 22 of the preferred embodiment functions to engage the cylindrical shaft. The hub output section 36 preferably defines the hub output surface 38 with a smooth section 48 (which functions to ease and center the assembly of the over-running clutch pulley 10 onto the cylindrical shaft), a threaded section 50 (which functions to substantially prevent rotation and to axially retain the hub member 22 to the cylindrical shaft), and a hexagonal section 52 (which functions to mate with an alien wrench for easy tightening and loosening of the over-running clutch pulley 10 onto and off of the cylindrical shaft). Of course, the hub output section 36 may include other suitable devices or define other surfaces to prevent rotational and axial slippage, to engage the cylindrical shaft, and to engage a tool for tightening or loosening the over-running clutch pulley 10 onto and off of the cylindrical shaft. The hub output surface 38 is preferably inwardly directed (toward the rotational axis of the over-running clutch pulley 10) and is preferably substantially cylindrically shaped. The hub output section 36 is preferably made from conventional structural materials, such as steel, and with conventional methods, but may alternatively be made from other suitable materials and from other suitable methods.

The over-running clutch pulley 10 of the preferred embodiment also includes a bearing member 56, which functions to allow relative rotational movement of the sheave member 20 and the hub member 22. The bearing member 56, which is preferably a rolling element type, preferably includes an outer race element 58 preferably press-fit mounted onto a sheave bearing surface 60 of the sheave member 20, an inner race element 62 preferably press-fit mounted onto a hub bearing surface 64 of the hub member 22, ball bearing elements 66 preferably located between the outer race element 58 and the inner race element 62, and bearing seals 68 preferably extending between the outer race element 58 and the inner race element 62 on either side of the ball bearing elements 66. The bearing member 56 may alternatively be of other suitable types, such as a journal bearing or a roller bearing, may alternatively include other suitable elements, and may alternatively be mounted to other suitable surfaces with other suitable manners. The bearing member 56 is a conventional device and, as such, is preferably made from conventional materials and with conventional methods, but may alternatively be made from other suitable materials and with other suitable methods.

The sheave clutch section 32 and the hub clutch section 40 of the preferred embodiment function to provide the sheave clutch surface 34 and the hub clutch surface 42, respectively, for the engagement with the clutch member 24. The sheave clutch section 32 preferably extends radially inward from the sheave member 20. In this manner, the sheave clutch section 32 is preferably made from the same material and with the same methods as the sheave input section 28, but may alternatively be made from other suitable materials and with other suitable methods. The hub clutch section 40 preferably extends radially outward from and axially over the hub output section 36. In this manner, the hub clutch section 40 is preferably made from the same material and with the same methods as the hub output section 36, but may alternatively be made from other suitable materials and with other suitable methods. The hub clutch section 40 preferably partially defines a clutch cavity 54 to contain the clutch member 24.

In the preferred embodiment, the sheave clutch surface 34 and the hub clutch surface 42 are located substantially adjacent with an axial gap 70 between each other. The sheave clutch surface 34 and the hub clutch surface 42 are preferably inwardly directed (toward the rotational axis of the over-running clutch pulley 10) and are preferably substantially cylindrically shaped. Furthermore, the sheave clutch surface 34 and the hub clutch surface 42 preferably have a similar radial diameter, and a similar axial length. These features allow optimum performance of the clutch member 24. The sheave clutch surface 34 and the hub clutch surface 42 may alternatively have differences with each other on these, or other, design specifications.

The clutch member 24 functions to engage the sheave clutch surface 34 and the hub clutch surface 42 upon the acceleration of the sheave member 20 in a first rotational direction relative to the hub member 22, and to disengage the sheave clutch surface 34 and the hub clutch surface 42 upon the deceleration of the sheave member 20 in the first rotational direction relative to the hub member 22. In the preferred embodiment, the clutch member 24 is a coil spring 72. The coil spring 72, which is made from conventional materials and with conventional methods, accomplishes the above features by the particular size and orientation of the coil spring 72 within the clutch cavity 54. In alternative embodiments, the clutch member 24 may include other suitable devices that accomplish the above features.

The coil spring 72 is preferably designed with a relaxed spring radial diameter that is sized slightly greater than an inner diameter of the sheave clutch surface 34 and the hub clutch surface 42. Thus, when inserted into the clutch cavity 54 and when experiencing no rotational movement of the sheave member 20 or the hub member 22, the coil spring 72 frictionally engages with and exerts an outward force on both the sheave clutch surface 34 and the hub clutch surface 42. Further, the coil spring 72 is preferably oriented within the clutch cavity 54 such that the coils extend axially in the first rotational direction from the sheave clutch surface 34 to the hub clutch surface 42. With this orientation, relative rotational movement of the sheave member 20 and the hub member 22 will result in an unwinding or winding of the clutch member 24. In other words, acceleration of the sheave member 20 in the first rotational direction relative to the hub member 22 will bias an unwinding of the coil spring 72 and deceleration of the sheave member 20 in the first rotational direction relative to the hub member 22 will bias a winding of the coil spring 72.

The unwinding of the coil spring 72 tends to increase the outward force of the coil spring 72 on the sheave clutch surface 34 and the hub clutch surface 42, thereby providing engagement, or "lock" of the sheave member 20 and the hub member 22. This engagement condition preferably occurs upon the acceleration of the sheave member 20 in the first rotational direction relative to the hub member 22. On the other hand, the winding of the coil spring 72 tends to decrease the outward force of the coil spring 72 on the sheave clutch surface 34 and the hub clutch surface 42, thereby allowing disengagement, or "slip", of the sheave member 20 and the hub member 22. This disengagement condition preferably occurs upon the deceleration of the sheave member 20 in the first rotational direction relative to the hub member 22.

During the "slip" condition of the over-running clutch pulley 10, the coil spring 72 will lightly rub across the sheave clutch surface 34 or the hub clutch surface 42, which may cause wear of these surfaces. Similarly, during the "lock" condition of the over-running clutch pulley 10, the coil spring 72 will forcefully engage with the sheave clutch surface 34 and the hub clutch surface 42, which may also cause wear of these surfaces. The coating 26 on the sheave clutch surface 34 and the hub clutch surface 42, in addition to providing protection against substantial corrosion, also provides a sufficient surface hardness to resist the wear of these surfaces by the clutch member 24.

To insure the proper placement of the clutch member 24 within the clutch cavity 54, the sheave member 20 of the preferred embodiment includes a sheave collar section 74 defining a sheave collar surface 76, and the hub clutch section 40 of the preferred embodiment defines a hub flange surface 78. The sheave collar section 74 preferably extends radially inward from the sheave input section 28 and adjacent the sheave clutch section 32. The sheave collar surface 76 and the hub flange surface 78 are preferably located on opposite ends of the clutch cavity 54. In this manner, the sheave collar surface 76 and the hub flange surface 78 cooperate with the sheave clutch surface 34 and the hub clutch surface 42 to actually define the clutch cavity 54. The over-running clutch pulley 10 of the preferred embodiment may, of course, use other suitable devices to insure the proper placement of the clutch member 24 within the clutch cavity 54. These devices may be surfaces defined by other sections of the sheave member 20 or the hub member 22, or surfaces defined by other suitable elements.

In the preferred embodiment, the coating 26 is disposed on the sheave input surface 30, the sheave clutch surface 34, the hub output surface 38, and the hub clutch surface 42, which protects against substantial corrosion and provides a sufficient surface hardness to resist wear of these surfaces. The coating 26 is also preferably disposed on the sheave collar surface 76 and the hub flange surface 78, which similarly protects against substantial corrosion and provides a sufficient surface hardness to resist wear of these surfaces. The coating 26, however, is also preferably disposed on every surface of the sheave member 20 and the hub member 22, including the sheave bearing surface 60 and the hub bearing surface 64, which minimizes the cost and difficulty in the application of the coating 26. The coating 26 may alternatively be disposed on fewer surfaces. The preferred embodiments of the invention substantially avoid forming, treating, or coating 26 specific surfaces or sections of the over-running clutch pulley to have a sufficient surface hardness.

The coating 26 preferably includes a first layer made from a zinc material, a second layer made from a zinc chromate material and a coloring agent material, and a third layer made from a zinc chromate material. The preferred composition and preferred layering of the coating 26 is well known in the metallurgical field. The coating 26 may alternatively include other suitable compositions and other suitable layering to increase corrosion and wear resistance. The coating 26 is preferably applied to the surfaces of the over-running clutch pulley with conventional methods, but may be alternatively applied with any suitable method.

As any person skilled in the art of over-running clutches will recognize from the previous detailed description and from the figures and claims, modifications and changes can be made to the preferred embodiment of the invention without departing from the scope of this invention defined in the following claims.

We claim:

1. An over-running clutch pulley for rotationally engaging an input device and an output device, comprising:
   a sheave member including a sheave input section defining a sheave input surface adapted to the engage the input device, and including a sheave clutch section defining a sheave clutch surface;
   a hub member located substantially concentrically within said sheave member, including a hub output section defining a hub output surface adapted to engage the output device, and including a hub clutch section defining a hub clutch surface substantially adjacent said sheave clutch surface;
   a clutch member adapted to engage said sheave clutch surface and said hub clutch surface upon the acceleration of said sheave member in a first rotational direction relative to said hub member, and to disengage said sheave clutch surface and said hub clutch surface upon the deceleration of said sheave member in the first rotational direction relative to said hub member; and
   a coating disposed on said sheave input surface, said sheave clutch surface, said hub output surface, and said hub clutch surface and adapted to protect against substantial corrosion and to increase wear resistance wherein said coating comprises a first layer and a second layer, said first layer including a zinc material other than zinc chromate, the second layer being disposed on said first layer and being substantially formed of a zinc chromate material.

2. The over-running clutch pulley of claim 1 wherein said sheave input surface includes two sheave shoulders and several sheave input grooves that cooperate to engage a drive belt as the input device and to substantially prevent rotational and axial slippage between said sheave input surface and the drive belt.

3. The over-running clutch pulley of claim 1 wherein said sheave member further includes a sheave collar section defining a sheave collar surface, wherein said sheave clutch surface and said sheave collar surface cooperate to substantially define a clutch cavity adapted to contain said clutch member; and wherein said coating is further disposed on said sheave collar surface.

4. The over-running clutch pulley of claim 1 further comprising a bearing member located between said sheave member and said hub member and adapted to allow relative rotational movement of said sheave member and said hub member.

5. The over-running clutch pulley of claim 4 wherein said sheave member defines a sheave bearing surface adapted to engage said bearing member; and wherein said coating is further disposed on said sheave bearing surface.

6. The over-running clutch pulley of claim 5 wherein said hub member defines a hub bearing surface adapted to engage said bearing member; and wherein said coating is further disposed on said hub bearing surface.

7. The over-running clutch pulley of claim 1 wherein hub output surface is adapted to engage a cylindrical shaft as the output device.

8. The over-running clutch pulley of claim 1 wherein said hub clutch section further defines a hub flange surface, wherein said hub clutch surface and said hub flange surface cooperate to substantially define a clutch cavity adapted to contain said clutch member; and wherein said coating is further disposed on said hub flange surface.

9. The over-running clutch pulley of claim 1 wherein said second layer includes a coloring agent material.

10. The over-running clutch pulley of claim 9 wherein said coating includes a third layer disposed on said second layer made from a zinc chromate material.

11. The over-running clutch pulley of claim 1 wherein said sheave clutch surface and said hub clutch surface are inwardly directed and cylindrically shaped.

* * * * *